6510X
D. Harrington.
Inkstand.
No. Patented Apr. 22, 1831.
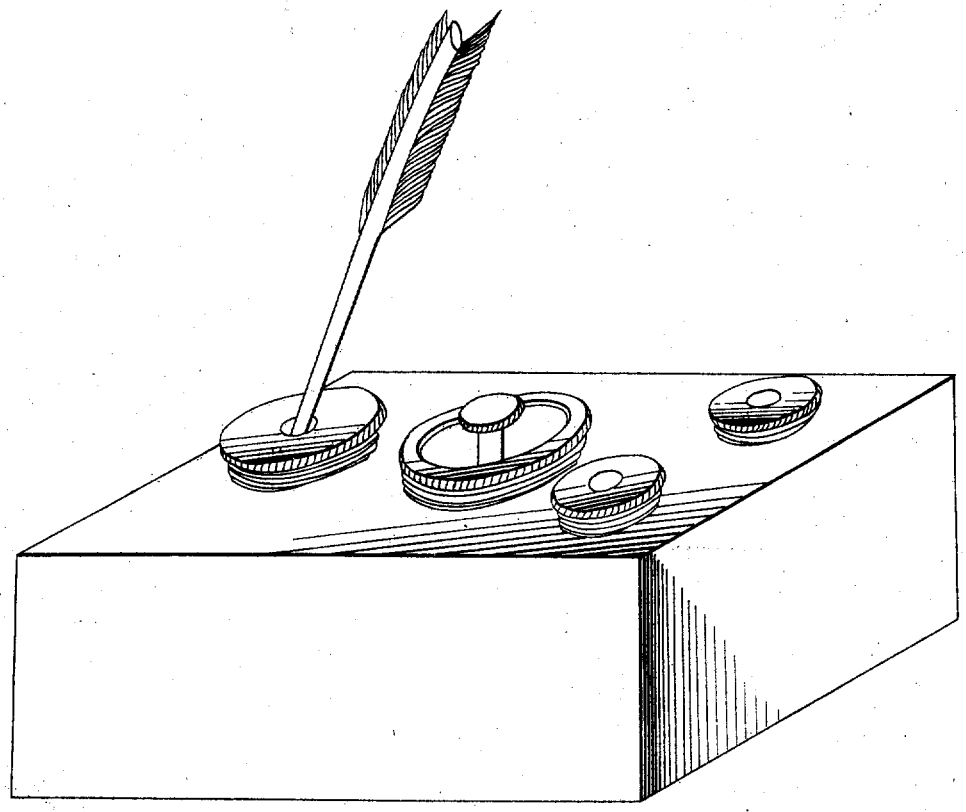
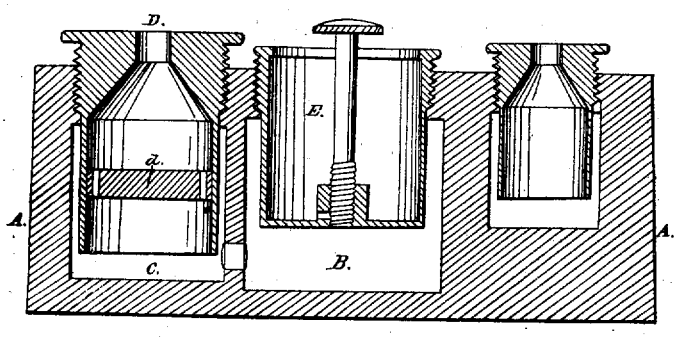
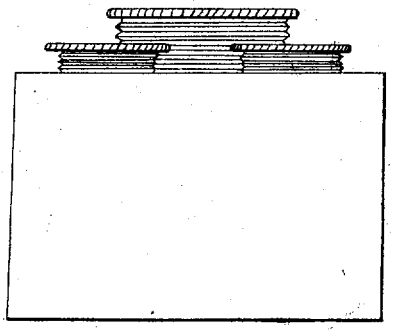

Daniel Harrington

The schedule referred to in these Letters Patent and making part of the same containing a description in the words of the said Daniel Harrington himself of his improvement in the Ink Holder. To all to whom these presents shall come Be it known that I Daniel Harrington of Philadelphia in the County of Philada and State of Pennsylvania have invented a new and useful improvement in the machine for supplying ink to the pen and that the following is a full and exact description of the construction and operation of the said machine as invented by me specified below and denominated the new Ink holder. The main body of this ink holder is, at the top part, three inches wide and five inches long. and at its bottom one eighth of an inch larger at its ends and sides than it is at its top. In depth it is two inches. This body of ink holder may be made of wood with a leather top or a metallic top. or the whole body may be made of wood metals or stone, as well as some other substances. as clay plaister of Paris &c in fine it may be made of any substance that will hold common ink of different colours, About the centre of the top of this body is sunk down within one quarter of an inch of the bottom, a round chamber for holding a supply of ink (say black ink) This chamber communicates at its side next to one end of the body with another chamber between it (the supply chamber) and the ends of the body. This second chamber top in diameter, say only one and a quarter inch in diameter is sunk down to near the same depth as the larger one, Into this smaller chamber is screwed from the top of the body a metallic oblong cup. say in length one and three quarters of an inch and in diameter one and a quarter inch made funnel form at the inner part of its upper end with an opening in its centre below of of a suitable diameter say one quarter of an inch through
which to insert a pen to receive ink. Below this opening
the insides of this metallic cup are parrellel and as large as the
diameter of the cup will admit of - and near its lowest
end within is fitted a thin piece of cork with two or three
holes at its sides through which the ink rises up to the
lowest part of the funnel form or hole through which the
pen is inserted. This cork may be drawn upwards or
pushed downwards so as to let the pen pass into the ink any
given depth to suit the wishes of the writer: also the metallic
cup may be screwed down deeper into the ink or screwed up
at pleasure. It will be readily seen that there are two prin-
ciples or ways of graduating the depth of the ink so that
the pen at each dip can take but a certain quantity of
ink viz. by raising or lowering the cork and by screwing
down or up the metallic cup. Another principle obtained
in this new ink holder is that the pen can never be inked so
high up as to blacken or soil the fingers of the writer unless
the cork is pushed quite too low down. Into the supply foun-
tain in the centre of the body is screwed an oblong metallic
cup and reservoir. If this supply chamber or fountain is
filled, say half full with ink and this cup and reservoir
is screwed down as it meets the ink it causes it to rise in the
chamber where the pen is to be inserted to any required
height. Here it will be readily seen is a fourth new,
principle. when all the ink has become exhausted from
the supply chamber or fountain. by screwing up to a proper
height the oblong cup (and reservoir (and then turning a
screw (upwards) in the centre of the cup. The ink which has
been previously put into the reservoir and kept in reserve is
let down through a hole in the lower end of said reservoir
into the supply chamber or fountain. here is a fifth prin-
ciple and by returning said centre screw to its place the oblong cup cups and reservoir may again be screwed downwards at
pleasure until all the ink has been forced into the other cham-
ber or fountain and used; after which, of course, a new sup-
ply must be furnished both to the supply chamber or foun-
tain and reservoir. The part that stands in the top
of the cups, blackened with holes in it is merely to set pens
in and may be retained and used or dispensed with as
there are holes enough in the body of the ink holder for
holding extra pens — The two smaller funnel form
metallic oblong cups at the other end of the body of the
ink holder for red and blue inks, are the same in all
respects as the one above described except that they are less
in diameter, say only three quarters of an inch in di-
ameter. They have their appropriate chambers or fountains,
in point of size but have no supply fountains, they graduate
to suit the wishes of the writer by screwing up or down, also by
drawing up or pushing down the corks in their lower ends —
Their fountains when exhausted are supplied again with ink
by pouring in at their tops. As relates to invention with re-
ference to this new ink holder the undersigned is aware that
the body of this ink holder though an oblong square on its
top is not so far different from some square forms of the old-
fashioned ink stand long in use as to be denominated a
discovery or invention: the same may be said of the chambers
or fountains as relates to their form size &c. for all forms (of
hollow vessels) from that of the half of an oyster shell to the old
fashioned common ink stand have been used from time
immemorial to this date: But all of the other parts of the new
ink holder as above specified the undersigned verily be-
lieves to be his own inventions exclusively and which in-
ventions and combinations justify him in his claim to the
invention of the
new ink holder. There is in addition to five new principles
already above mentioned as belonging to the new ink holder

6510X or, one more say a sixth viz: when the inkholder is done with
for the day, or not wanted for a given time by screwing up-
wards the metallic cup into which the pen is inserted for
the reception of ink until the cork appears naked of ink, the
air is nearly altogether excluded from the ink and the process
of evaporation prevented. or the metallic cup may be com-
pletely stopped by a cork or other stopper, There is like-
wise a seventh principle belonging to the new ink-
holder. If from long use dregs collects in the chamber
or fountain by screwing out the cups &c the chambers are
readily come at by a large opening at their tops (very differ-
ent from the old fashioned inkstands) and easily washed
out. It may be necessary to say further that the top part
of the body of the above described inkholder is leather is ce-
mented upon wood with common glue, and that the
screws on the different cups &c cut their necessary depth
of screw into the leather by wetting the edge of the leather on their
first being turned into their respective places or chambers,
The chambers of the body being made of wood should be
filled for a short time with (hot) melted beeswax so
that the pores of the wood may be stopped with the wax
for the better holding of the ink after the wax has become
hard in the pores of the wood. The out side of the body
and part of the surface of the cups is covered with paint, say
1. 2. or 3 coats. The inventor believes that lead or pewter will
be the metal used mostly hereafter, for both bodies and
cups &c of the ink holder as calculated to afford the ink
holder generally at a lower price; tho' stone (made like the stone
ware and burnt) may be used in part and metal in
part, In the Model accompanying this specification
(now deposited in the patent office, the cups are also
made of brass but one, which is made of lead. The brass
cup and reservoir has in its top with holes in it a com- [illegible]

6510X

1441

✓ piece made of tin standing in the cup, on three tin legs as above described for to stand fast in. This piece as then said may dispense with Daniel Harrington Witnesses:
N. T. Dillingham
J. Dillingham 1441 [illegible]